U. AMMANN.
ROAD ROLLER.
APPLICATION FILED JULY 30, 1914.

1,246,696.

Patented Nov. 13, 1917.
3 SHEETS—SHEET 1.

Witnesses:
Earle L. Parmelee
E. G. McCarthy

Inventor:
U. Ammann,
by Bakewell, Byrnes & Parmelee,
Attys.

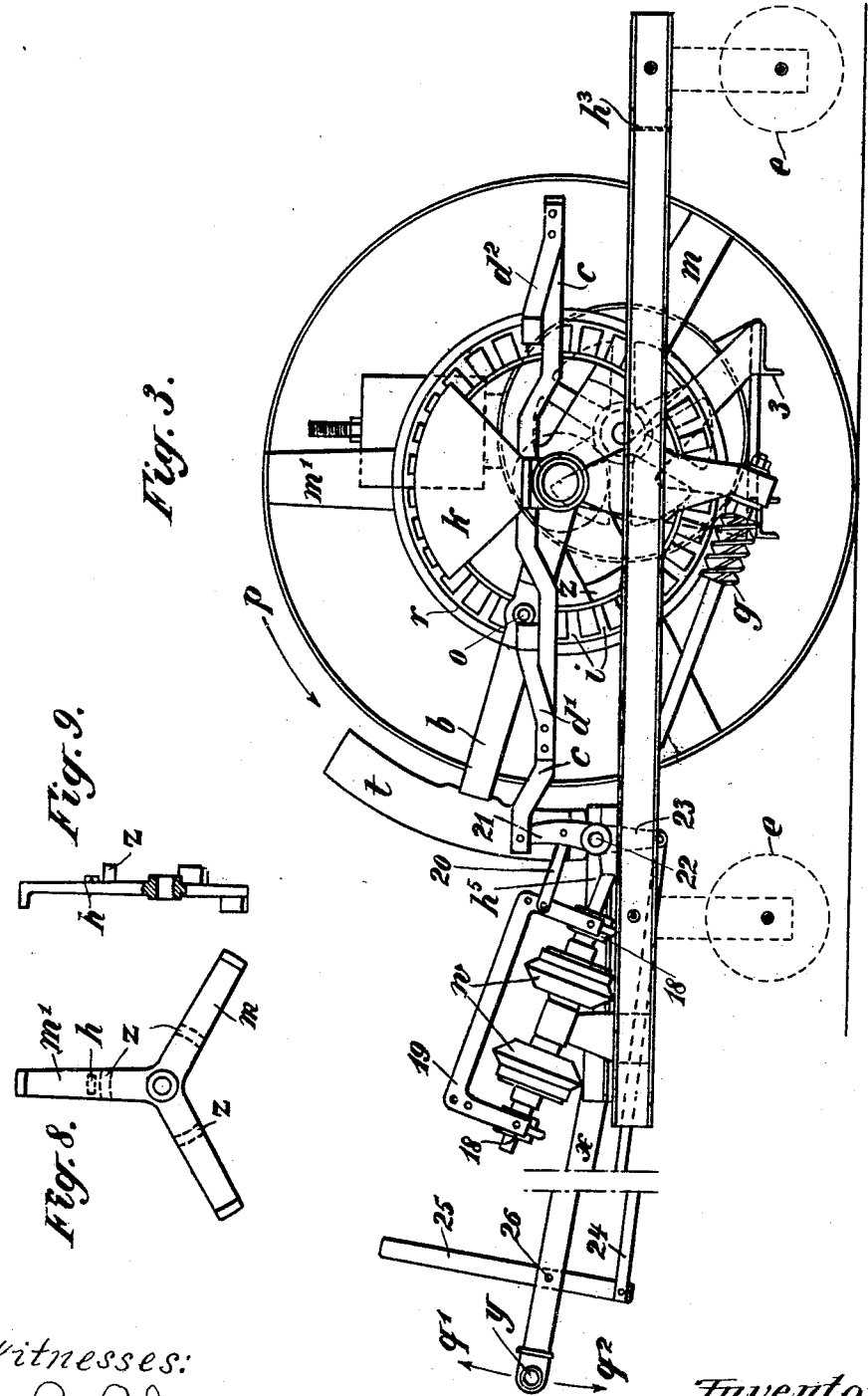

U. AMMANN.
ROAD ROLLER.
APPLICATION FILED JULY 30, 1914.
1,246,696.
Patented Nov. 13, 1917.
3 SHEETS—SHEET 3.
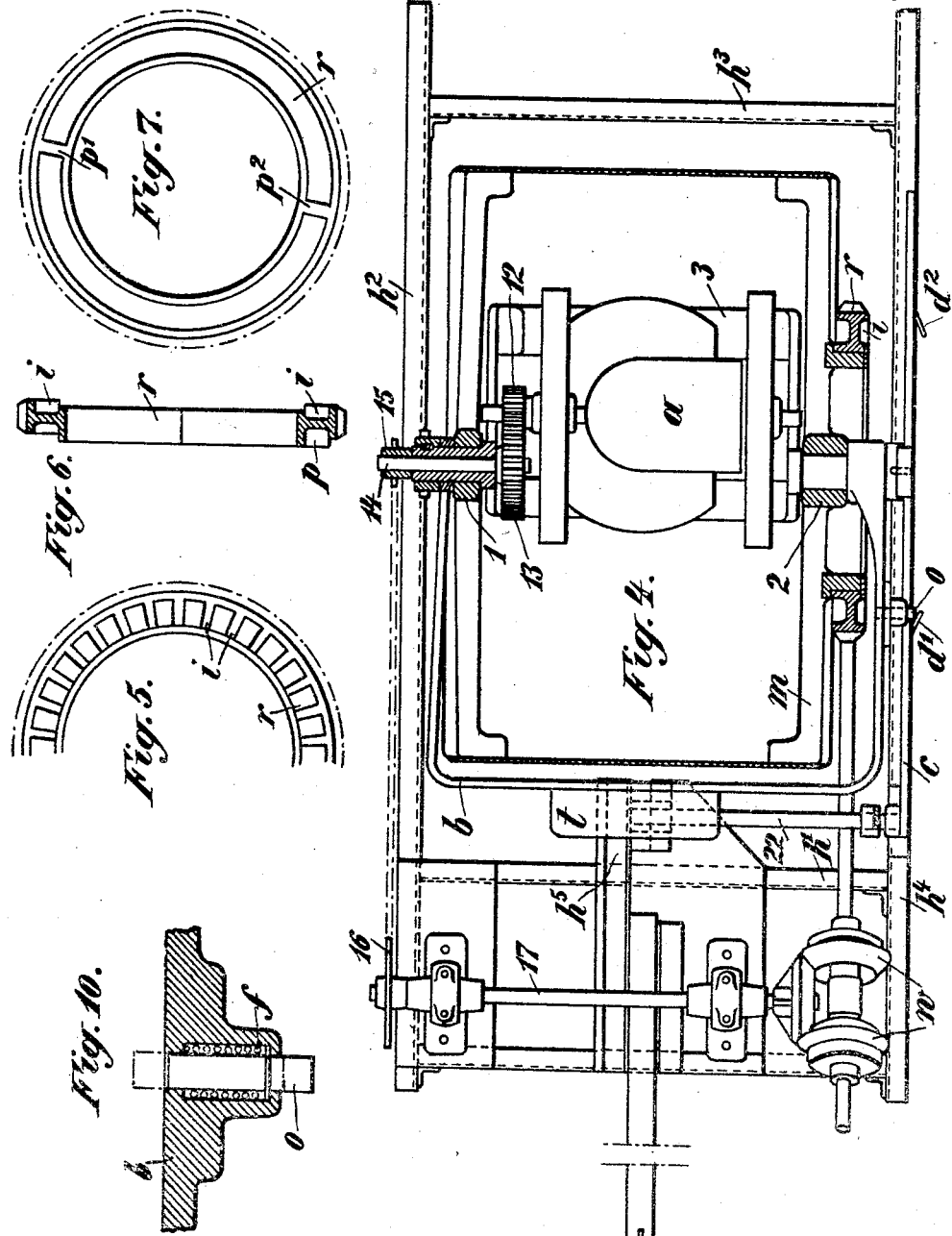

UNITED STATES PATENT OFFICE.

ULRICH AMMANN, OF LANGENTHAL, SWITZERLAND.

ROAD-ROLLER.

1,246,696.　　　　Specification of Letters Patent.　　Patented Nov. 13, 1917.

Application filed July 30, 1914. Serial No. 854,115.

*To all whom it may concern:*

Be it known that I, ULRICH AMMANN, a subject of Switzerland, residing at Bützbergstrasse, Langenthal, Switzerland, have invented new and useful Improvements in Road-Rollers, of which the following is a specification.

The present invention relates to various improvements in road rollers provided with a motor drive and manually operated steering bars.

Figure 1:
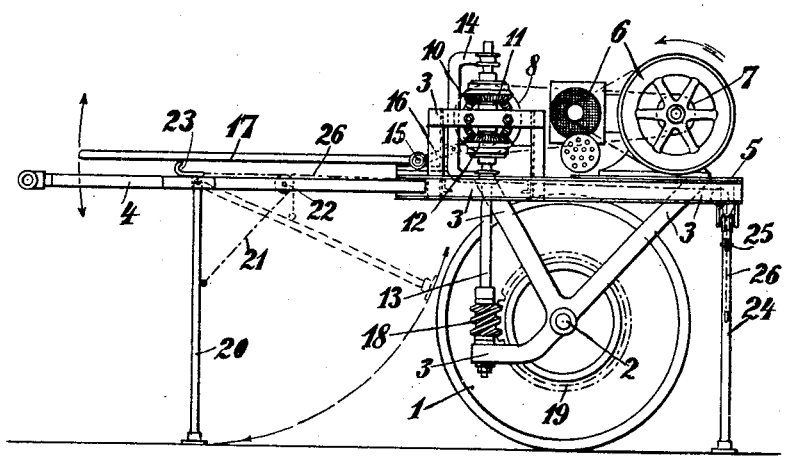
Figure 2:
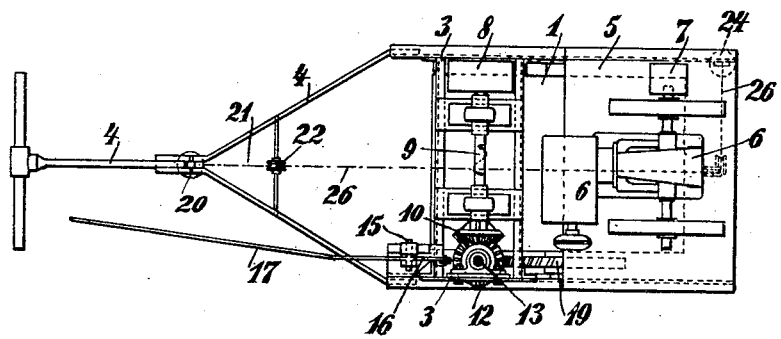

In the accompanying drawings which illustrate the improvements in various constructions by way of example, Figure 1 is an elevation and Fig. 2 a plan of one construction of road roller and Fig. 3 is an elevation and Fig. 4 a plan of a second construction. Figs. 5 to 10 are views of details.

In the construction of road roller shown in Figs. 1 and 2 the motor and the transmission gear are arranged upon a platform or podium above the roller. Into the transmission gear connecting the motor and the roller is built in a reversing and throwing-out device which may be operated by means of a lever mechanism the driven portion of which is arranged within the reach of the driver.

Upon the axle 2 of the roller 1 is mounted the frame 3. To the latter is secured the steering bar 4 by means of which the roller may be steered by the driver who walks behind the roller. Upon the platform 5 of the frame is mounted a motor 6 which is connected to the shaft 9 by a belt drive comprising pulleys 7 and 8. A change gear comprising a bevel gear 10 secured to the shaft 9 and two bevel gears 11 and 12 adapted to be coupled alternately to the shaft 13, is interposed between the shaft 9 and the worm gear 18, 19, the worm or screw 18 being fixed to the shaft 13 and the worm gear 19 being fixedly mounted upon the shaft 2. A fork-shaped frame 14 engages into grooved disks connected to the bevel gears 11 and 12, this frame being actuated by means of a double-armed lever 16, 17 pivoted at 15, the end of the arm 17 extending close to the handle of the steering bar 4. According to the position of the arm 17 one or the other of the bevel gears 11, 12 may be brought into engagement with the gear 10, or both gears may be thrown out of engagement so that the roller 1 may be either reversed or entirely disconnected from the gear. It will be obvious that such an arrangement has great practical advantages in connection with road rollers.

In order to hold the platform 5 in a horizontal position when the roller is at rest, the steering bar 4 is provided with a folding support 20. At the rear of the frame 3 there is provided another support 24 consisting of two parts which are hinged to each other at 25. Upon the steering bar 4 a hook 23 is arranged in a position accessible to the driver; two cords or chains 21 and 26 being connected to this hook. The cord or chain 21 passes over rollers and is connected to the support 20 while the cord or chain 26 is connected to the lower part of the support 24. By pulling the hook 23 and hooking the same into the handle of the steering bar 4 the supports 20 and 24 are pulled upward and maintained in their inoperative positions.

In the above described construction of road roller, the motor and the transmission gear are mounted upon a frame resting upon the axle of the drum of the roller. This has the disadvantage that the roller may overturn if it is brought into a certain inclined position, as owing to the elevated position of the frame, motor and gear, the center of gravity of the whole apparatus lies above the axis of the roller or drum. In order to obviate this drawback it has been suggested in connection with road rollers to suspend the motor and the transmission gear in the interior of the roller from the axle thereof. Such rollers, however, were not provided with a change- and disconnecting-gear. If such gears were to be arranged in the interior of the roller a very complicated construction would result. Moreover, it would be impossible to operate the change-gear during the operation, which is very essential with road rollers. According to the invention this difficulty has been removed by arranging the change-gear outside the drum in cases where the motor is suspended inside the drum. A construction of road roller showing this feature is shown by way of example in Figs. 3 and 4, various parts of said construction being shown in detail in Figs. 5 to 10.

In the interior of the roller a platform 3 is suspended from the axle boxes 1 and 2, while exterior of the roller is suspended a frame ($h$, having bar members $h'$, $h^2$, $h^3$, $h^4$ and $h^5$). An explosion motor $a$ is mounted upon the platform 3, a gear 12 which is arranged upon the shaft of the motor meshing with a gear 13 fixed upon a shaft 14 mounted in the hollow axle of the roller. The shaft 14 is connected to the counter shaft 17 mounted upon the frame $h$ by a chain drive comprising chain wheels 15 and 16. The shaft 17 is connected by a change-gear with the shaft of the worm or screw $g$ which latter meshes with a worm wheel $r$ mounted at one end of the roller drum and adapted to rotate the latter.

Two bevel gears $w$ are loosely mounted upon the worm shaft, a friction coupling being provided in the interior of each gear, the slidable part of which coupling carries a slide-ring 18 (Fig. 3). Into the two slide-rings 18 engages a fork-shaped frame 19 which is connected by a link 20 with a lever 21 mounted upon a shaft 22. A second lever 23 on the shaft 22 is connected by a pull rod 24 with the hand lever 25. The latter is mounted upon a pivot 26 on the steering bar $x$ and is so arranged that it can be easily operated by the driver.

In all known hand rollers with motor drive, there is the disadvantage that the driver has to overcome the reaction pressure of the drive, which reaction pressure according to the direction in which the roller moves, exerts upon the handle of the steering bar either an upward or a downward pressure.

In order to obviate this drawback, there is provided a balancing weight $t$. This weight is mounted upon a yoke $b$ which is adapted to swing upon the axle of the roller. In the position shown the weight $t$ rests upon the beam $h^5$ and is calculated to balance the reaction pressure which during the forward drive of the drum in the direction of the arrow $p$ (Fig. 3) acts upon the handle in the direction of the arrow $q^1$. It is assumed that the motor arranged upon the platform 3 is arranged so as to balance the weight of the frame with the transmission and change-gear and the steering bar.

If by operating the bevel gears $w$ the direction of the drive is reversed, the reaction pressure will act upon the handle $y$ in the direction of the arrow $q^2$. The weight $t$ should, therefore, in order to balance this pressure be displaced to the other side of the roller. This is effected by turning the yoke $b$ about the axle of the drum until the weight rests upon the beam $h^3$. In order to effect this displacement of the balancing weight $t$ automatically on the reversal of the direction of the drive, the following arrangement is provided:—

The worm ring $r$ is not fixedly connected to the drum. It rests upon three projections $z$ which are concentrically arranged upon the spoke star $m$ (Figs. 5 to 9), and is, therefore, rotatable around the axle of the roller. This worm ring $r$ has an I section (Fig. 6) and the annular flanges are connected at the outer side by a large number of ribs $i$. On the inner side the two annular flanges are connected by two oppositely arranged ribs only, viz. $p^1$ and $p^2$. Upon the vertical arm $m^1$ of the spoke star there is provided a projection $h$ which is so arranged that when the worm ring $r$ rotates, either the one of the other of the two ribs $p^1$, $p^2$ must strike the projection $h$ and carry the spoke star and the roller. The roller must, therefore, be carried by the ring when the latter has performed at the utmost one half of a revolution. In the yoke $b$ there is provided a spring bolt $o$ (Figs. 4 and 10) in such a manner that the inner end thereof may be caused to project into the space between two adjacent ribs $i$. A spring $f$ normally tends to move the bolt in the opposite direction so that it does not project between these ribs. Upon a rod $c$ connected to the reversing mechanism there are provided two comparatively strong and slightly yielding arms $d^1$, $d^2$ which are formed with cam surfaces (Fig. 4).

In the position of the balancing weight $t$ and the reversing mechanism shown in Fig. 4, the bolt $o$ is held in its inoperative position by the spring (compare Fig. 10) and the cam surface of the spring arm $d^1$ just touches the bolt. The worm wheel $r$ acts with its rib $p^1$ against the right hand side of the projection $h$. If the reversing gear is now operated the arm $d^1$ presses the bolt $o$ inwardly, the inclined cam surface sliding over the projecting outer end of the bolt (Fig. 4). This causes the inner end of the bolt to take between two ribs $i$. The worm wheel $r$ now runs first loosely upon the projections $z$ until after about half a revolution the rib $p^2$ strikes against the left side of the projection $h$ and carries the roller in the opposite direction. During this half revolution of the worm wheel $r$ one of the ribs $i$ rotates the yoke $b$ and weight $t$ by means of the bolt $o$. As the weight $t$ is considerable the bolt $o$ is pressed against the rib $i$ with such force that the tendency of the spring $f$ to return the bolt to its normal position is overcome. In order to prevent the bolt $o$ from being returned to its inoperative position by the spring $f$ during the time when the yoke $b$ assumes or approaches the vertical position, there is provided a guide surface $k$ which retains the bolt in its operative position during this part of the movement of the yoke. The weight $t$ reaches the beam $h^3$ shortly before the rib $p^2$ comes into contact with the left side of the projection $h$. The bolt $o$ is then freed from the lateral pressure and is returned to its inoperative position by the spring $f$. The worm wheel then continues its rotation without further carrying the yoke $b$ and carries by means of the rib $p^2$ acting against the projection $h$ the roller in the opposite direction. The weight $t$ has changed its position in accordance with the reversal of the direction of the drive, and therefore again counter-balances the reaction pressure.

In order to support the frame when the roller is at rest, there may be provided supporting rollers $e$ in front and behind the roller as indicated by dotted lines in Fig. 3.

I claim:—

1. A road-roller comprising a motor suspended in the interior of the roller drum, a shaft mounted in the hollow axle of the drum, said motor driving on to said shaft, a counter shaft arranged outside the drum and connected to said shaft, and change-gear provided on said counter shaft for driving said drum, substantially as described.

2. A road-roller comprising a motor suspended in the interior of the roller drum, a shaft mounted in the hollow axle of the drum, said motor driving on to said shaft, a counter shaft arranged outside the drum and connected to said shaft, variable gearing on said counter shaft for driving said drum, and means on said steering bar for controlling said gearing, substantially as described.

3. A road-roller comprising a motor drive, a frame adapted to turn about the axle of the roller drum, a manually operated steering bar connected to said frame, a counter-weight for balancing the reaction pressure of the motor upon said steering bar, said counter-weight resting on said frame, and means for altering the position of said counter-weight either in front or behind the drum according to the direction of the drive, substantially as described.

4. A road roller comprising a motor drive, a frame adapted to turn about the axle of the roller drum, a manually operated steering bar connected to said frame, a counter-weight for balancing the reaction pressure of the motor upon said steering bar, said counter-weight resting on said frame, and means for automatically altering the position of said counter-weight either in front or behind the drum according to the direction of the drive, substantially as described.

5. A road-roller comprising a motor drive, a frame adapted to turn about the axle of the roller drum, a manually operated steering bar connected to said frame, a yoke adapted to swing about the axle of the roller drum, and a counter-weight on said yoke adapted to balance the reaction pressure of the motor upon said steering bar, substantially as described.

6. A road-roller comprising a motor suspended in the interior of the roller drum, a shaft mounted in the hollow axle of the drum, said motor driving on said shaft, a countershaft arranged outside said drum and connected to said shaft, a frame adapted to turn about the axle of said roller drum, a manually operated steering bar connected to said frame, change-gearing on said counter shaft, means for operating said change-gearing from said steering bar, a yoke adapted to swing about the axle of the roller drum, and a counter-weight on said yoke adapted to balance the reaction pressure of the motor upon said steering bar, substantially as described.

In testimony whereof I have signed my name to this specification in the presence of two subscribing witnesses.

ULRICH AMMANN.

Witnesses:
J. M. BOWCOCK,
E. SUTTER.

Copies of this patent may be obtained for five cents each, by addressing the "Commissioner of Patents, Washington, D. C."